June 20, 1933.     K. B. LACY     1,914,921
PROCESS OF DISTILLATION
Filed Sept. 6, 1929
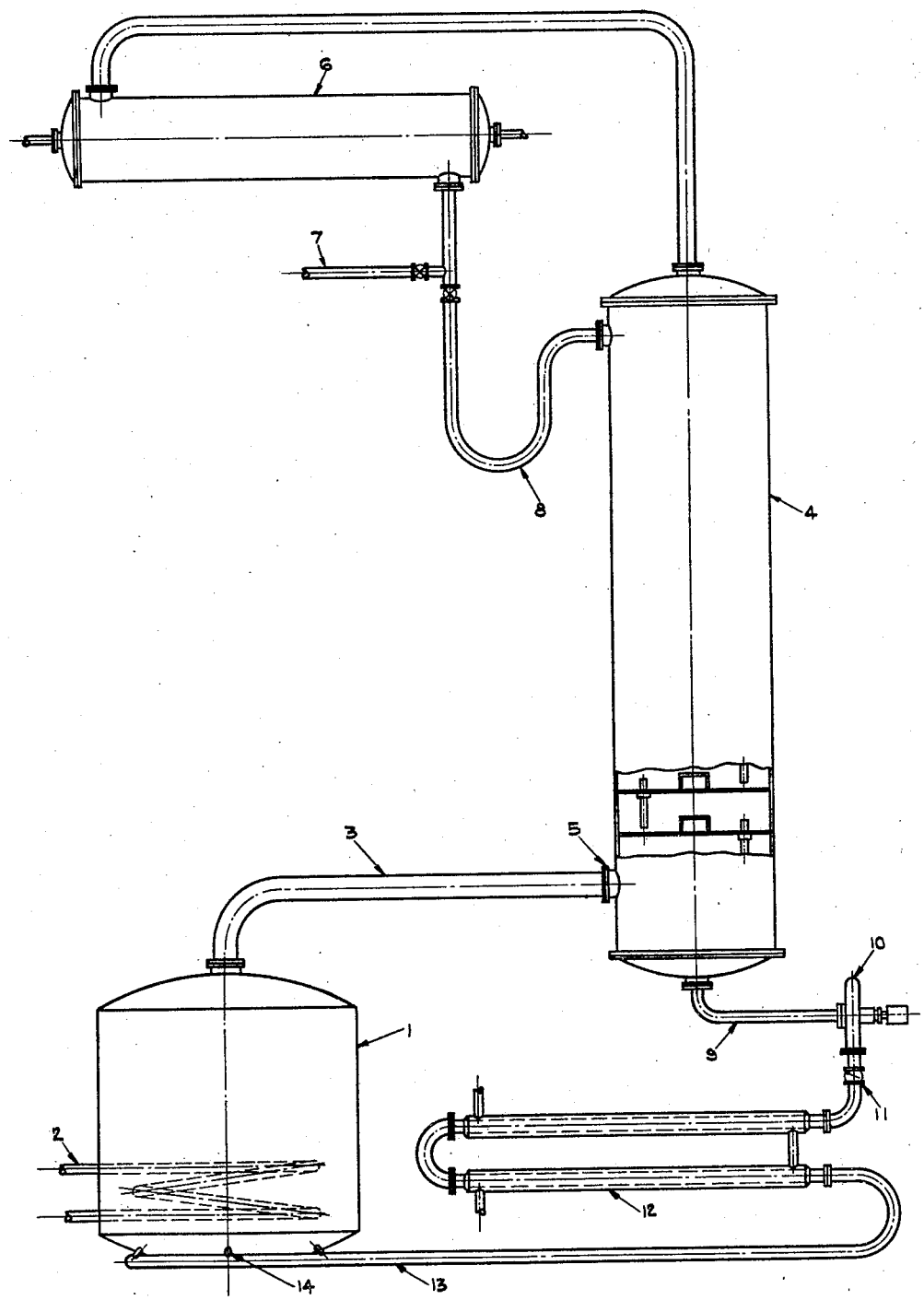
WITNESS: Lawrence N. Geib     INVENTOR: Kenneth B. Lacy.

Patented June 20, 1933

1,914,921

UNITED STATES PATENT OFFICE

KENNETH B. LACY, OF HIGHLAND PARK, ILLINOIS, ASSIGNOR TO VAN SCHAACK BROS. CHEMICAL WORKS, INC., OF CHICAGO, ILLINOIS, A CORPORATION OF ILLINOIS

PROCESS OF DISTILLATION

Application filed September 6, 1929. Serial No. 390,685.

This invention relates to an improvement in the process of distillation and, particularly, to a method of decreasing the amount of heat which it is necessary to supply to a still or a body of liquid from which liquid is being vaporized.

In fractionally distilling certain mixtures of materials, it is difficult to supply all of the required heat to the still proper. An example is found in the manufacture of ethyl acetate from acetate of lime, sulfuric acid, and alcohol. The sulfuric acid liberates acetic acid and forms calcium sulfate. The acetic acid, in turn, reacts with ethyl alcohol, according to the equation

$$CH_3COOH + C_2H_5OH \rightleftharpoons CH_3COOC_2H_5 + H_2O$$

The reaction is reversible, as indicated. By fractional distillation, it is possible to remove from the still a mixture that is relatively rich in ethyl acetate and thus cause the reaction to proceed with the production of additional amounts of ester.

Unfortunately, the calcium sulfate, formed as above stated, mixed with tar contained in the calcium acetate, coats the steam coils ordinarily used to supply the heat required to effect the fractionation. This coating of calcium sulfate decreases markedly the heat transfer per unit of steam coil surface. To offset this decrease in effectiveness of the heating coils, several expedients have been tried. Some of these, together with certain disadvantages, follow: (1) Removal of the scale from the coils. It is inconvenient to do this cleaning as frequently as necessary. (2) Use of a larger number or greater surface of steam coils. This may bring the coils so close together in the still, for example, in several concentric spirals, as to interfere with the circulation and consequent thorough mixing of the more or less soft mud that comprises the reaction mixture. (3) Use of live steam in open-end pipes or pipes with perforations. The steam so used, condensing in the reaction mixture, lowers the concentration of reacting substances, namely alcohol and acetic acid, and thus prolongs the time required for the esterification of a satisfactory percentage of the acetic acid.

The effect of the reflux, in a fractionation, on the heat consumption is well understood. It is not unusual, for example, to return three-fourths of all material vaporized as a liquid reflux down the column. This means that, of the effective heat actually used in the fractionation, a very large proportion is required to revaporize the liquid reflux. If this reflux could be vaporized at some point outside and returned as vapor to the still proper, there would be a large decrease in the heat that it is necessary to supply through the coated coils inside the still. My invention provides for this outside vaporization of the reflux.

I return the refluxing liquid, not directly from the bottom of the fractionating column to the still, as in the usual practice, but, instead, through an outside evaporator from which the reflux goes, in vapor form to the still. In like manner, refluxing liquid may be withdrawn from the column at some point above the bottom, as for example, half-way from the bottom to the top, this liquid passed through an evaporator, and the vaporized reflux returned to the column itself at some point lower than that from which the liquid reflux was originally withdrawn.

The invention is not limited to the manufacture of any substance or to any one set-up or type of apparatus. The invention may be illustrated, however, by the following example of one method of practicing it.

Reference is made to the figure which shows, diagrammatically, a set-up for the practice of my invention. In a copper still 1 are placed calcium acetate (socalled acetate of lime), ethyl alcohol, and sulfuric acid. The mixture is brought to boiling by steam in a coil of copper tubing 2. As the boiling continues, the vapors that are formed pass from the still through a copper pipe 3 into a copper fractionating column 4 at a point 5 somewhat above the lower end of the upright column 4. The vapors rise through the column 4 to a condenser 6. A part of the condensate goes thru the pipe 7 to storage and a part back through pipe 8 and down the column 4 as the reflux. The refluxing liquid, when it reaches the bottom of the column is not allowed to return directly to the still 1, as in the usual practice. Instead it passes through a pipe 9 and to a pump 10 and thru check valve 11 into a series of steamjacketed pipes 12 constituting a flash-evaporator. The resulting, vaporized reflux is then delivered through a copper pipe 13 to the still 1. When this vapor is passed into the still through several separate nozzles 14, suitably spaced around the still 1, the entrance of the vapor agitates the mixture in the still as well as furnishes heat.

It will be understood that the process of vaporizing the reflux outside the still may be applied to operations other than the manufacture of ethyl acetate. For example, it may be used in the manufacture of butyl acetate (from calcium acetate, sulfuric acid, water, and butanol). My process may be used also in the fractional distillation of alcohol from fermented mash.

It may be used also in fractionations where the still is heated directly, as by a flame or hot gases on the outside, instead of being heated, as in the illustration above, by steam, within coils, inside the still. An example, is the fractionation of petroleum or a product thereof from a direct-fired still. When the bottom of the still receives a coating, as, for example, carbonaceous material, it becomes increasingly difficult to supply sufficient heat for the distillation and fractionation without local overheating of the still walls. By vaporizing the clear refluxing liquid outside the still and returning the reflux to the still as vapor, there is decreased greatly the amount of heat that must be supplied through the coated bottom or walls of the still.

Many variations may be made in the design of equipment for the practice of my invention. Thus, there may be used a plate or packed fractionating column, dephlegmator on top of column or condenser that condenses all of the vapor and returns a part of the condensate as reflux, batch or continuous fractionation, flash or pot evaporator for vaporizing the reflux before return to the still. If a pot evaporator is used, it must have a very small capacity in proportion to the volume of reflux. Otherwise, the composition of vaporized reflux returned to the still at any instant may not be the same as that of reflux being delivered by the column.

Heat may be supplied to the evaporator in any convenient manner, as by steam, hot oil, hot flue gas, or direct fire. I have found satisfactory the use of such a temperature that the reflux liquid is substantially completely volatilized in the evaporator.

The vaporized reflux may be returned to the still at any of several points. I find suitable the return of the vaporized reflux at a point or points well below the surface of the liquid in the still, as, for example, at points near the bottom of the still.

If desired, a rotation may be given to the mass in the still by returning the vaporized reflux through a number of horizontal nozzles tangential to the circumference of the still (if circular) or more or less parallel to the side of the still (if a plane surface).

Other conditions than coating of the heating surface by solids may make desirable supplying, outside the still, as much as possible of the heat required in the fractionation. Corrosion of heating coils or surface is such a condition. The manufacture of ethyl acetate from synthetic acetic acid, alcohol, sulfuric acid, and water is an example. The mixture corrodes many of the materials available for constructing steam coils. The reflux from the fractionating column, on the other hand, is substantially free from acid and may be vaporized, before returning to the still, in an evaporator constructed of relatively inexpensive material, as, for example, iron or steel.

My invention is applicable also to distillations that do not involve fractionation. For example, liquid that is to be returned from a certain layer of condensed distillate may be passed through an evaporator and returned in vapor form to the still. An example is the steam distillation of an ester in which it is desired to return the lower, aqueous layer of condensate to the still. This lower layer may first be passed through an evaporator from which it is delivered as vapor to the still.

I claim:

1. In a process of fractional distillation involving vaporization of a liquid, condensation of the vapors, and refluxing of a portion of the condensate, the step which comprises vaporizing a liquid reflux, substantially without decomposition, and mixing the vapors with the liquid being distilled, the changes in state being brought about substantially by temperature changes alone.

2. In a process of fractional distillation involving vaporization of a liquid, condensation of the vapors, and refluxing of a portion of the condensate, the step which comprises completely vaporizing a liquid reflux, substantially without decomposition, and mixing the vapors with the liquid being distilled, the changes in state being brought about substantially by temperature changes alone.

3. In a process of fractional distillation involving vaporization of a liquid, condensation of the vapors, and refluxing of a portion of the condensate, the step which comprises completely vaporizing a liquid reflux, substantially without decomposition, and mixing the vapors at a plurality of points with the liquid being distilled, the changes in state being brought about substantially by temperature changes alone.

4. In a process of fractional distillation involving vaporization of a liquid, condensation of the vapors, and refluxing of a portion of the condensate, the step which comprises completely vaporizing a liquid reflux, substantially without decomposition, and injecting the vapors tangentially at a plurality of points into the liquid being distilled, so as to agitate the mass, the changes in state being brought about substantially by temperature changes alone.

5. A process of fractionally distilling liquids from a mixture that gives a deposit on heating surfaces, in which a portion of the distillate is returned to the system as reflux liquid, and in which said reflux liquid is evaporated substantially without decomposition prior to being mixed with the body of liquid being distilled, the changes in state being brought about substantially by temperature changes only.

6. A process of fractionally distilling liquids from a mixture that gives a deposit on heating surfaces, in which a portion of the distillate is returned to the system as reflux liquid, and in which said reflux liquid is flash evaporated substantially without decomposition prior to being mixed with the body of liquid being distilled, the changes in state being brought about substantially by temperature changes only.

KENNETH B. LACY.